P. A. WOOD.
ATTACHMENT FOR MOTOR VEHICLES.
APPLICATION FILED JUNE 12, 1916.
1,194,111.
Patented Aug. 8, 1916.
4 SHEETS—SHEET 2.
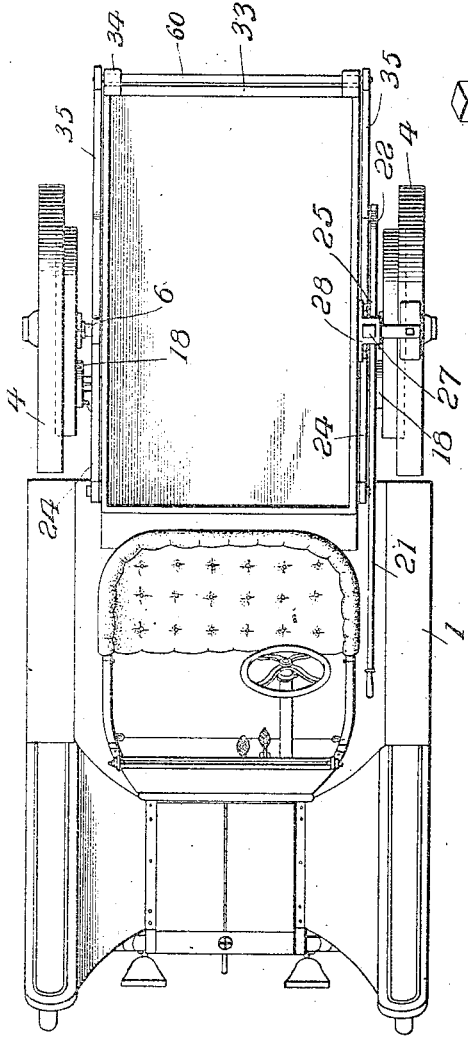
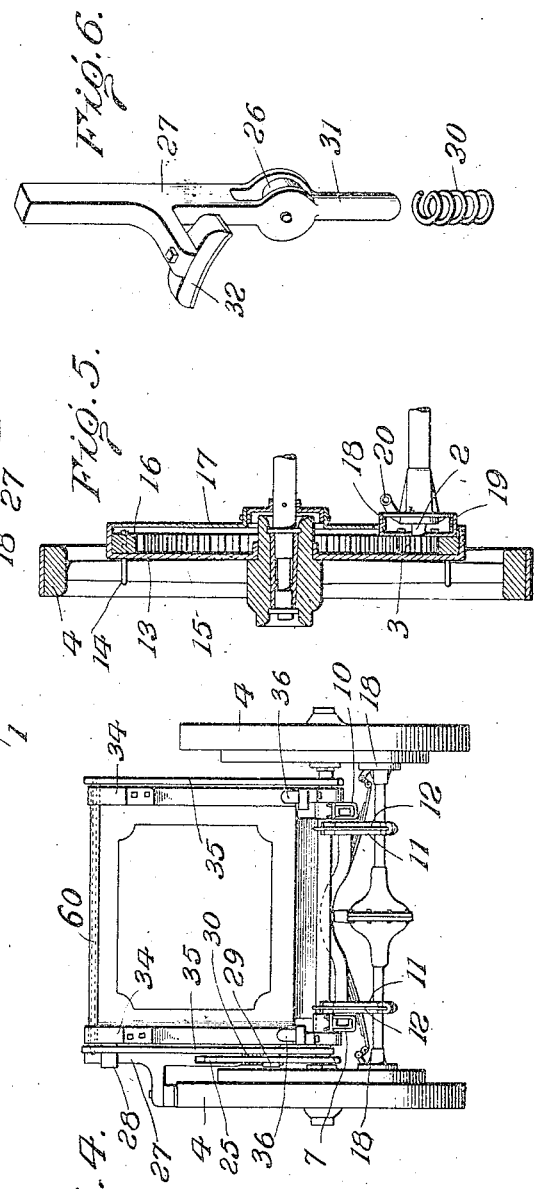
Inventor
Pinckney A. Wood P. A. WOOD.
ATTACHMENT FOR MOTOR VEHICLES.
APPLICATION FILED JUNE 12, 1916.
1,194,111.
Patented Aug. 8, 1916.
4 SHEETS—SHEET 3.
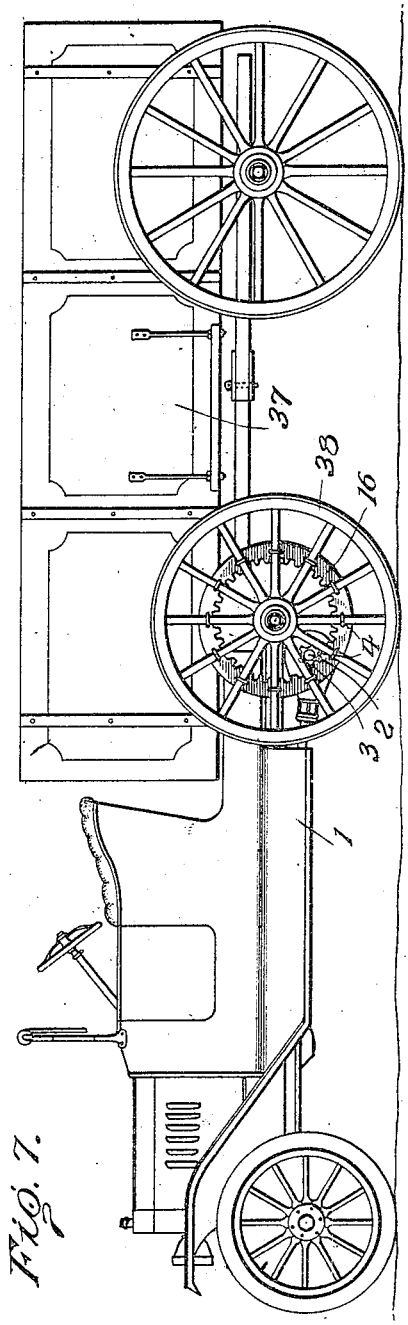
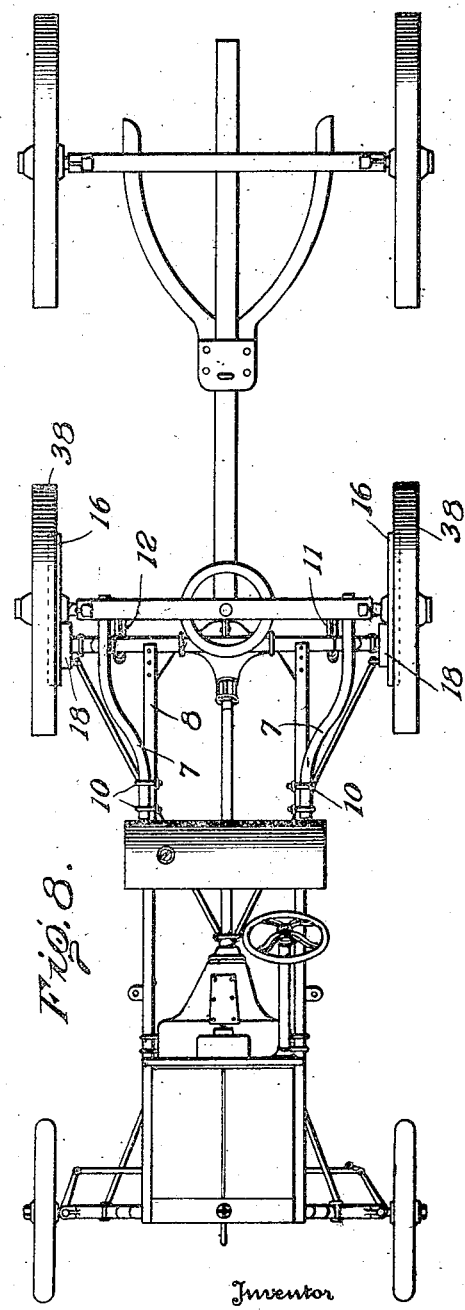
Inventor
Pinckney A. Wood
By Bradford & Doolittle
Attorneys P. A. WOOD.
ATTACHMENT FOR MOTOR VEHICLES.
APPLICATION FILED JUNE 12, 1916.
1,194,111.
Patented Aug. 8, 1916.
4 SHEETS—SHEET 4.
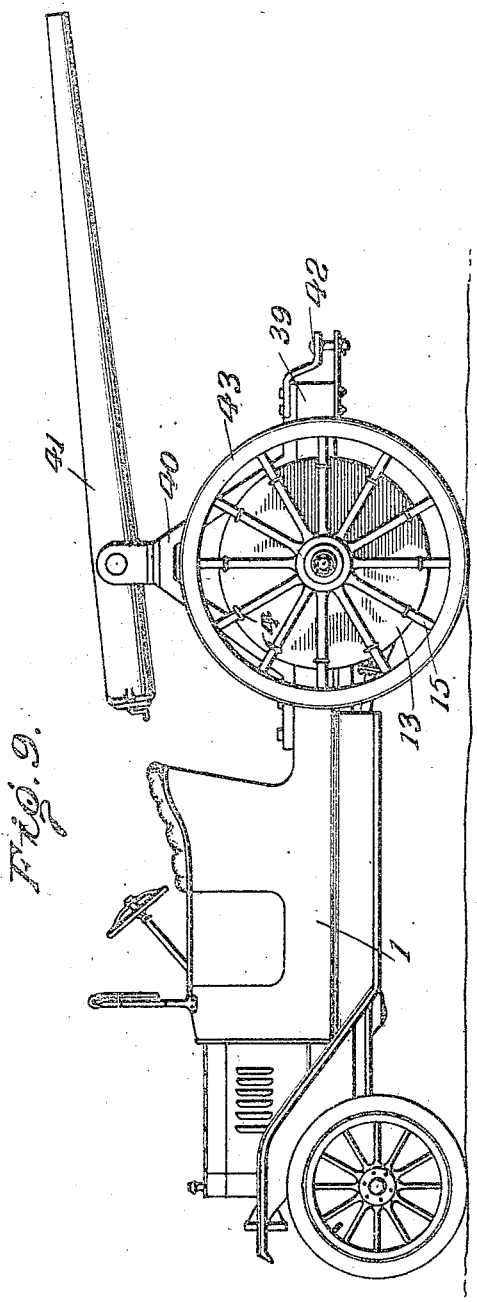
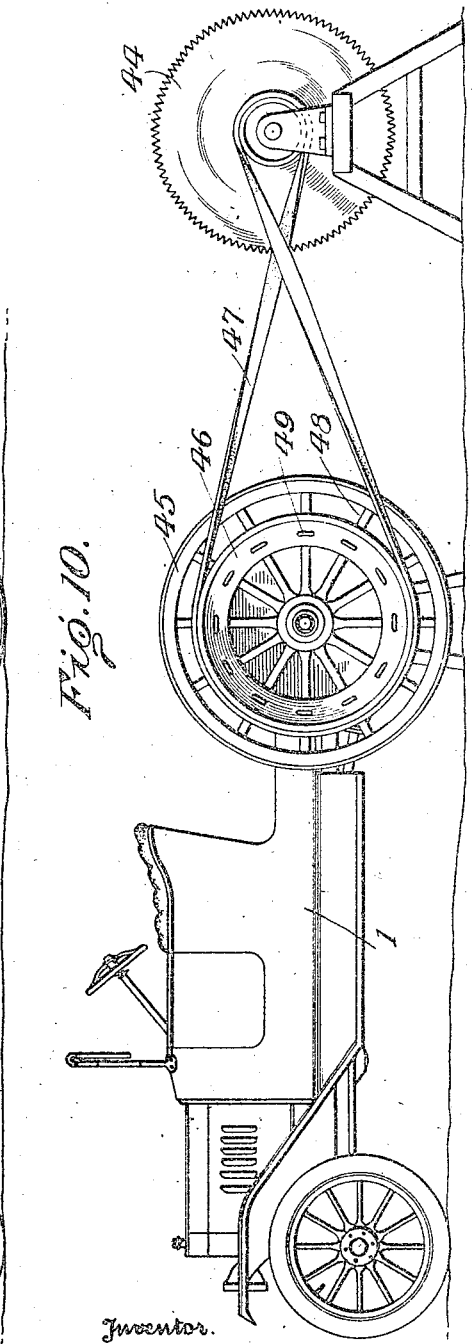
Inventor.
Pinckney A. Wood
By
Attorneys

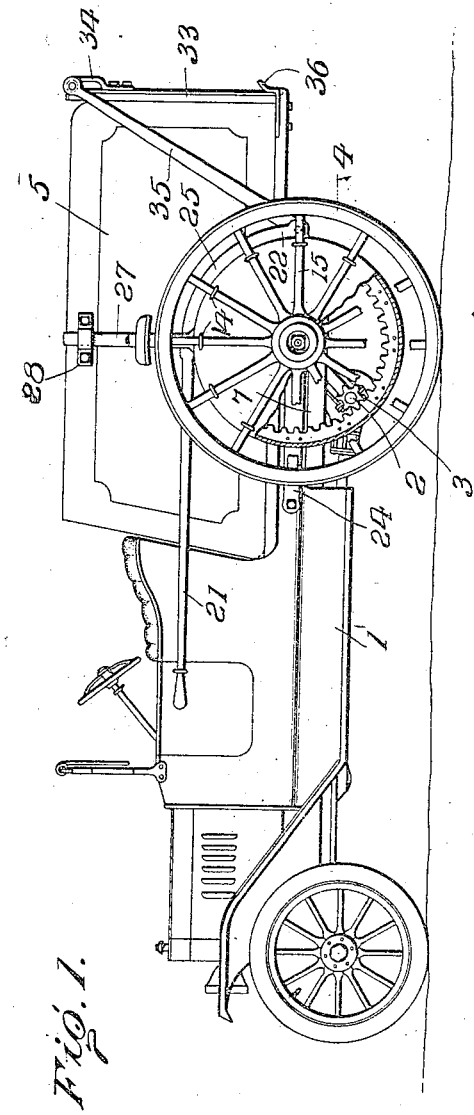

UNITED STATES PATENT OFFICE.

PINCKNEY A. WOOD, OF MEMPHIS, TENNESSEE, ASSIGNOR OF ONE-HALF TO THOMAS U. SISSON, OF WINONA, MISSISSIPPI.

ATTACHMENT FOR MOTOR-VEHICLES.

1,194,111.   Specification of Letters Patent.   Patented Aug. 8, 1916.

Application filed June 12, 1916. Serial No. 103,249.

*To all whom it may concern:*

Be it known that I, PINCKNEY A. WOOD, a citizen of the United States, residing at Memphis, Shelby county, and State of Tennessee, have invented and discovered certain new and useful Improvements in Attachments for Motor-Vehicles, of which the following is a specification.

My present invention relates to means for converting ordinary automobiles into dump carts, vehicles for trucking, and other heavy work, and consists in the combinations and arrangements of parts hereinafter described and particularly set forth in the accompanying claims.

The invention has for its purpose to provide an arrangement for readily connecting a dumping body, ordinary hauling body vehicle, or trailer, to any regular passenger carrying motor car, to the end of obtaining the convertibility of such car in the art of hauling material, or other heavy work.

A further purpose of the invention consists in providing a driving connection, or transmission, between the driven axle of the automobile and the wheels of the carrying vehicle in a manner which will derive the maximum driving power of the engine, and to utilize all of the tractive power available; and increase the draw-bar pull and load carrying capacity of the motor car.

The invention further contemplates the employment of an arrangement for the purpose stated, which may readily be connected to any automobile without altering the construction thereof, and wherein the car will be ready for its first intended use when the carrying vehicle or trailer has been removed therefrom and the regular motor car wheels replaced.

The invention is shown by way of illustration in the accompanying drawings, wherein—

Figure 1 illustrates the adaptation of the invention for hauling a dumping cart, Fig. 2 is similar view showing the cart dumped, Fig. 3 a top plan view of Fig. 1, Fig. 4 a rear elevational view thereof, Fig. 5 a detail, central sectional view of the transmission gearing, Fig. 6 a detail view of the dumping device, Fig. 7 shows the invention adapted for drawing a trailer wagon, Fig. 8 is a top plan view of Fig. 7 with the respective vehicle bodies removed, Fig. 9 shows the application of the invention for military purposes, and Fig. 10 shows a further adaptation of the invention, to wit, wood sawing.

Referring to the construction in further detail, 1 designates an ordinary motor-driven vehicle, preferably a passenger carrying automobile, and the driven axle 2 of which may have the wheels removed. A pair of pinions 3 is mounted on the axle 2 at the respective ends thereof, and is connected to drive the wheels 4 of the coupled vehicle in a manner to be explained.

The coupled and auxiliary vehicle consists of a dumping cart whose body 5 is mounted to tilt on the axle 6, and a pair of bars or hounds 7 connect the dumping cart with the chassis 8 of the motor car 1. The hounds 7 are connected to the axle 6 by U-bolts 9 and similar connecting devices 10 are employed for securing the hounds to the chassis 8. A pair of struts 11, having tie rods 12 are employed to mount or support the driven axle 2 from the axle 6 of the dumping cart. The body of the cart rests upon the body of the pulling vehicle and thus distributes the weight of the carried load.

The two cart wheels 4 are each provided with a casing 13 that is detachably mounted thereon by means of U-bolts 14 connected to the several spokes 15, as shown in Fig. 5, and an internal gear wheel 16 is secured to said casing by the fastening devices 14 to engage with its respective pinion 3 of the driven shaft. A plate 17 is mounted on the casing 13 to inclose the gearing (3 and 16), and thereby exclude all dirt or other foreign matter as will be understood. The driven shaft 2 has the usual brake drum 18 (see Fig. 5) adapted for engagement with the expansible band 19 of the braking device that connects with the arm 20. The gear casings 13 are of large diameters with respect to the wheels, and thereby serve as supporting or reinforcing elements for the wheels to which they are secured.

The body 5 of the dumping cart is adapted to be automatically tilted for emptying its load by means of a hand-operated lever 21, that is fulcrumed at its rear end 22 to the extension 23 of one of the bars 24 that is mounted on the side of the vehicle body, and engages with the axle 6. Said lever 21 has a curved portion 25 engaging with a roller 26 (see Figs. 2 and 6) that is carried by the vertically movable member 27 mounted on one side of the cart. The bar 27 has limited vertical movement in a pair of guides or brackets 28 and 29, and a spring 30 is mounted on the arm portion 31 of said member to normally hold the shoe 32 on the member out of engagement with the tire of the wheel.

In operation the body 5 is tilted automatically by depressing the lever 21 to bring the shoe 32 into engagement with the tire of the wheel and then on slightly moving the cart rearwardly said member together with the body is tilted on the axle 6. The body 5 is returned to normal position by depressing the lever 21 to bring the shoe 32 of the arm 27 into engagement with the tire of the wheel 4 and this engagement between said shoe and the wheel, will, on the initial forward motion of the vehicle, bring the cart body to its normal or horizontal position.

An end gate 33 for the cart is swingingly mounted, by slotted members 34, on a rod 60 connecting a pair of arms 35 that are formed continuous with the side bars 23 and project upwardly and rearwardly therefrom after the manner shown in Figs. 1 and 2. On the tilting operation of the body 5, the end gate will swing freely to the rear as indicated in Fig. 2 and when the body is restored to normal position said end gate, will, by gravity, assume a vertical position and be engaged by the pair of clips 36 mounted on the rear end of the cart.

The arrangement shown in Figs. 7 and 8 shows the invention adapted for drawing an ordinary wagon 37, whose front wheels 38 are provided with internal gears 16 engaging with the pinions 3 of the driven axle after the manner described of the arrangement shown in Figs. 1 and 2.

In the construction shown in Fig. 9, the vehicle body 1 has a rearwardly extending portion 39 for supporting the mount 40 of a gun 41, and a carriage for ammunition is adapted to be connected to the coupling device 42 shown at the rear end of the body extension 39. With this arrangement i. e. adapting the device to military use, the ordinary driving wheels are removed as in the other instances, and the wheels 43 of the gun carriage connected to the driving pinions 3 as explained.

In the arrangement shown in Fig. 10, the invention is adapted for driving a saw 44 or for other similar use, and for this purpose one of the wheels 45 of the converted automobile has mounted thereon a pulley 46 on which travels the belt 47 that is connected to drive the saw. The pulley 46 is detachably secured to the wheel spokes 48 by U-bolts 49 or other suitable fastening devices.

It will therefore be seen from the foregoing that the proposed utilization of the automobile as disclosed herein will adapt the same for hauling vehicles of the wagon or dump cart type, or trailers generally; and for drawing a gun carriage or operating a saw, threshing machine, or other like purposes.

It is obvious that those skilled in the art may vary the details of construction and arrangement of parts without departing from the spirit of my invention, and therefore I do not wish to be limited to such features except as may be required by the claims.

I claim:

1. A motor driven vehicle comprising in part an ordinary automobile having the wheels of the driven axle thereof removed and pinions substituted therefor, and another vehicle attached to said automobile by connection whereby the rear of the automobile is supported by an axle of said attached vehicle, said axle of said attached vehicle being secured adjacent to and parallel with the driven axle of said automobile and the wheels of said axle being provided with gears fixedly attached thereto and arranged to mesh with and be driven by the pinions on the driven axle of the automobile, substantially as set forth.

2. A motor driven vehicle comprising an automobile of any appropriate type having the wheels removed from its driven axle, pinions mounted on said driven axle, a second load-carrying vehicle connected by hounds to the chassis of the automobile to support and carry the rear end thereof, an axle of said second vehicle being arranged parallel with and adjacent to the rear axle of said automobile, wheels on said axle of the attached vehicle, and gears fixedly attached to said wheels and meshing with the pinions on the driven axle of the automobile, whereby the load-carrying vehicle also carries the rear of the automobile and the driven axle of the automobile propels the combined motor driven vehicle through the traction wheels of said attached vehicle by direct intermeshing gears, substantially as set forth.

3. In a motor driven vehicle, the combination of an automobile of any appropriate type having a driven axle with the wheels thereof removed, pinions mounted on said axle, a second vehicle attached to the rear of the chassis of the automobile to support and carry the same, an axle of the attached vehicle being secured adjacent to and parallel with the driven axle of the automobile, spoked load-carrying wheels mounted on said axle of the attached vehicle, gear wheels fitted around the hubs of said spoked wheels and provided with internal gears meshing with the pinions on the driven axle of the automobile, and means for detachably securing said gear wheels to the several spokes of said wheels, substantially as set forth.

In witness whereof I have hereunto set my hand and seal at Washington, District of Columbia, this twelfth day of June, A. D., nineteen hundred and sixteen.

PINCKNEY A. WOOD. [L. S.]

Witnesses:
E. W. BRADFORD,
E. T. CLEMENTS.